(12) United States Patent
Chou et al.

(10) Patent No.: US 11,476,462 B2
(45) Date of Patent: Oct. 18, 2022

(54) LIFEPO4 PRECURSOR FOR MANUFACTURING ELECTRODE MATERIAL OF LI-ION BATTERY AND METHOD FOR MANUFACTURING THE SAME

(71) Applicant: National Tsing Hua University, Hsinchu (TW)

(72) Inventors: Lih-Hsin Chou, Hsinchu (TW); Li-Wen Hu, Hsinchu (TW); Chun-Yu Pan, Hsinchu (TW); Shao-Ting Hung, Hsinchu (TW); Kuei-Chao Wu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 332 days.

(21) Appl. No.: 16/554,077

(22) Filed: Aug. 28, 2019

(65) Prior Publication Data

US 2019/0386306 A1  Dec. 19, 2019

Related U.S. Application Data

(60) Continuation-in-part of application No. 15/152,023, filed on May 11, 2016, now abandoned, which is a
(Continued)

(30) Foreign Application Priority Data

Jun. 22, 2011 (TW) .................. 100121791

(51) Int. Cl.
*H01M 4/58* (2010.01)
*H01M 10/0525* (2010.01)
(Continued)

(52) U.S. Cl.
CPC .......... *H01M 4/5825* (2013.01); *B82Y 30/00* (2013.01); *B82Y 40/00* (2013.01); *C01B 25/45* (2013.01);
(Continued)

(58) Field of Classification Search
None
See application file for complete search history.

(56) References Cited

U.S. PATENT DOCUMENTS

2002/0039687 A1   4/2002  Barker et al.
2004/0157126 A1*  8/2004  Belharouak ........... H01M 4/366
                                                             429/231.8
(Continued)

FOREIGN PATENT DOCUMENTS

CN     1431147 A     7/2003
CN   101327920 A    12/2008
(Continued)

OTHER PUBLICATIONS

Assat et al ("Rapid Microwave-Assisted Solvothermal Synthesis of Non-Olivine Cmcm Polymorphs of LiMPO4 (M=Mn, Fe, Co, and Ni) at Low Temperature and Pressure", Inorganic Chemistry, 2015, 54, 10015-10022).*
(Continued)

*Primary Examiner* — Ula C Ruddock
*Assistant Examiner* — Tony S Chuo
(74) *Attorney, Agent, or Firm* — Muncy, Geissler, Olds & Lowe, P.C.

(57) ABSTRACT

An LiFePO$_4$ precursor for manufacturing an electrode material of an Li-ion battery and a method for manufacturing the same are disclosed. The LiFePO$_4$ precursor of the present disclosure can be represented by the following formula (I):

$$LiFe_{(1-a)}M_aPO_4 \qquad (I)$$

(Continued)

wherein M and a are defined in the specification, the LiFePO$_4$ precursor does not have an olivine structure, and the LiFePO$_4$ precursor is powders constituted by plural flakes.

21 Claims, 6 Drawing Sheets

Related U.S. Application Data division of application No. 13/529,221, filed on Jun. 21, 2012, now Pat. No. 9,368,794.

(51) Int. Cl.
| | | |
|---|---|---|
| B82Y 30/00 | (2011.01) | |
| C01B 25/45 | (2006.01) | |
| C01G 49/00 | (2006.01) | |
| B82Y 40/00 | (2011.01) | |

(52) U.S. Cl.
CPC .... *C01G 49/0027* (2013.01); *H01M 10/0525* (2013.01); *H01M 2220/30* (2013.01)

(56) References Cited

U.S. PATENT DOCUMENTS

| | | | |
|---|---|---|---|
| 2006/0127750 A1* | 6/2006 | Okada | H01M 4/0471 |
| | | | 429/122 |
| 2006/0127767 A1* | 6/2006 | Gauthier | C01B 25/37 |
| | | | 429/221 |
| 2007/0292747 A1* | 12/2007 | Chiang | H01M 4/136 |
| | | | 429/52 |
| 2008/0241690 A1 | 10/2008 | Delacourt et al. | |
| 2008/0292522 A1 | 11/2008 | Kim et al. | |
| 2013/0108776 A1 | 5/2013 | Li et al. | |

FOREIGN PATENT DOCUMENTS

| | | | | |
|---|---|---|---|---|
| CN | 101330141 A | 12/2008 | | |
| CN | 101980956 A | 2/2011 | | |
| CN | 107665983 A | 2/2018 | | |
| CN | 108321390 A | * | 7/2018 | ........ H01M 10/0525 |
| WO | WO-2007/058432 A1 | 5/2007 | | |

OTHER PUBLICATIONS

Tarascon et al., "Hunting for Better Li-Based Electrode Materials via Low Temperature Inorganic Systems", Chemistry of Materials Review, 2010, 22, p. 724-739, 16 pages.

Delacourt et al., "Size Effects on Carbon-Free LiFePO4 Powders The Key to Superior Energy Density", Electrochemical and Solid-State Letters, 2006, 9 (7), A352-A355, 4 pages.

Kim et al., "Synthesis of LiFePO4 Nanoparticles in Polyol Medium and Their Electrochemical Properties", Electrochemical and Solid-State Letters, 2006, 9 (9), A439-A442, 4 pages.

Islam et al., "Atomic-Scale Investigation of Defects, Dopants, and Lithium Transport in the LiFePO4 Olivine-Type Battery Material", Chemistry of Materials Review, 2005, 17, p. 5085-5092, 7 pages.

Gibot et al., "Room-temperature single-phase Li insertion/extraction in nanoscale LixFePO4", Nature Materials, 2008, p. 741-747, 7 pages.

Teng et al., "Self-assembly of LiFePO4 nanodendrites in a novel system of ethylene glycol-water", Journal of Crystal Growth, 2010, p. 3493-3502, 10 pages.

Wu et al., "Hierarchical Carbon-Coated LiFePO 4 Nanoplate Microspheres with Hight Electrochemical Performance for Li-Ion Batteries", Advance Materials, 2011, p. 1126-1129, 4 pages.

Rangappa et al., "Directed growth of nanoarchitected LiFePO4 electrode by solvothermal synthesis and their cathode properties", Journal of Power Sources, 2010, p. 6167-6171, 5 pages.

Yang et al., "Solvothermal Synthesis of LiFePO4 Hierarchically Dumbbell-Like Microstructures by Nanoplate Self-Assembly and Their Application as a Cathode Material in Lithium-Ion Batteries", The Journal of Physical Chemistry, 2009, p. 3345-3351, 7 pages.

Li et al., "Morphological solution for enhancement of electrochemical kinetic performance of LiFePO4", Electrochemica Acta, 2010, p. 995-999, 5 pages.

Sun et al., "Monodisperse Porous LiFePO4 Microspheres for a High Power Li-Ion Battery Cathode", Journal of the American Chemical Society, 2011, p. 2132-2135, 4 pages.

Ouyang et al., "First-principles study of Li ion diffusion in LiFe PO4", Physical Review, 2004, 104303-1-104303-5, 5 pages.

Kim et al., "Synthesis of Highly Crystalline Olivine-Type LiFePO4 Nanoparticles by Solution-Based Reactions", Surface Review and Letters, 2010, vol. 17, Iss. 1, p. 111-119, 9 pages.

Meligrana et al., "Hydrothermal synthesis of high surface LiFePO4 powders as cathode for Li-ion cells", Journal of Power Sources, 2006, p. 516-552, 7 pages.

Nan et al., "Solvothermal synthesis of lithium iron phosphate nanoplates", Journal of Materials Chemistry, 2011, vol. 21, p. 9994-9996, 3 pages.

Lou et al., "Synthesis of LiFePO4/C cathode materials with both high-rate capability and high tap density for lithium-ion batteries", Journal of Materials Chemistry, 2011, vol. 21, p. 4156-4160, 5 pages.

* cited by examiner

LIFEPO4 PRECURSOR FOR MANUFACTURING ELECTRODE MATERIAL OF LI-ION BATTERY AND METHOD FOR MANUFACTURING THE SAME

CROSS REFERENCE TO RELATED APPLICATION

This application is a continuation-in-part (CIP) of U.S. patent application for "LiFePO$_4$ flakes for Li-ion battery and method for manufacturing the same", U.S. application Ser. No. 15/152,023 filed May 11, 2016, and the subject matter of which is incorporated herein by reference.

U.S. application Ser. No. 15/152,023 filed May 11, 2016 is a divisional application of U.S. application Ser. No. 13/529,221 filed Jun. 21, 2012 which claims the benefits of the Taiwan Patent Application Serial Number 100121791, filed on Jun. 22, 2011, the subject matter of which is incorporated herein by reference.

BACKGROUND

1. Field

The present disclosure relates to a LiFePO$_4$ precursor for manufacturing an electrode material of an Li-ion battery and a method for manufacturing the same. More specifically, the present disclosure provides a novel LiFePO$_4$ precursor for manufacturing an electrode material of an Li-ion battery and a method for manufacturing the same.

2. Description of Related Art

As the development of various portable electronic devices continues, more and more attention focuses on the techniques of energy storage, and batteries are the main power supplies for these portable electronic devices.

Among commercial batteries, small-sized secondary batteries are especially the major power supplies for portable electronic devices such as cell phones and notebooks. In addition, secondary batteries are applied to not only portable electronic devices, but also electric vehicles.

Among the developed secondary batteries, the lithium secondary batteries (also named as the Li-ion batteries) developed in 1990 are the most popular batteries used nowadays. The cathode material of the initial lithium secondary batteries is LiCoO$_2$. LiCoO$_2$ has the properties of high working voltage and stable charging and discharging voltage, so the secondary batteries which use LiCoO$_2$ as a cathode material are widely applied to portable electronic devices. Then, LiFePO$_4$ with an olivine structure and LiMn$_2$O$_4$ with a spinal structure were also developed as a cathode material for lithium secondary batteries. Compared to LiCoO$_2$, the safety of the batteries can be improved, the charge/discharge cycles can be increased, and the cost can be further reduced when LiFePO4 or LiMn$_2$O$_4$ is used as cathode material of secondary batteries.

Although the batteries which use LiMn$_2$O$_4$ as cathode materials have low cost and improved safety, the spinal structure of LiMn$_2$O$_4$ may collapse during the deep discharge process, due to Jahn-Teller effect. In this case, the cycle performance of the batteries may further degrade. When LiFePO$_4$ is used as cathode material of batteries, the batteries also have the properties of low cost and further improved safety. In addition, the capacity of LiFePO$_4$ is higher than that of LiMn$_2$O$_4$, so the batteries made from LiFePO$_4$ can further be applied to devices, which need large current and high power. Furthermore, LiFePO$_4$ is a non-toxic and environmentally friendly material, and also has great high temperature characteristics. Hence, LiFePO$_4$ is considered as an excellent cathode material for lithium batteries. Currently, the average discharge voltage of the lithium batteries using LiFePO$_4$ as a cathode material is 3.2~3.4 V vs. Li$^+$/Li.

A conventional structure of the Li-ion batteries comprises: a cathode, an anode, a separator, and a Li-containing electrolyte. The batteries perform the charge/discharge cycles by the lithium insertion and extraction mechanism, which is represented by the following equations (I) and (II).

$$\text{Charge: } LiFePO_4 - xLi^+ - xe^- \rightarrow xFePO_4 + (1-x)LiFePO_4 \quad (I)$$

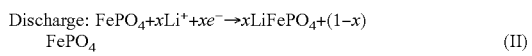

$$\text{Discharge: } FePO_4 + xLi^+ + xe^- \rightarrow xLiFePO_4 + (1-x)FePO_4 \quad (II)$$

When a charge process of the batteries is performed, Li ions extract from the structure of LiFePO$_4$; and the Li ions insert into the structure of FePO$_4$ when a discharge process is performed. Hence, the charge/discharge process of the Li-ion batteries is a two-phase process of LiFePO$_4$/FePO$_4$. However, the diffusion rate of the Li ions in LiFePO$_4$ and FePO$_4$ is quite low, so some metal dopants may generally be added into the cathode materials to increase the diffusion rate of the Li ions. In addition, the Li-ion diffusion path of the currently used LiFePO$_4$ is long, so the conductivity of LiFePO$_4$ is not good enough. Hence, the LiFePO$_4$ powders may be coated with carbon to increase the conductivity of LiFePO$_4$ powders, in order to increase the charge/discharge efficiency of the batteries. However, the process for manufacturing LiFePO$_4$ powders becomes more complicated when the LiFePO$_4$ powders are doped with metal additives or coated with carbon. In this case, the cost of the batteries is also increased.

Currently, the LiFePO$_4$ powders are usually prepared by a solid-state process. However, the property of the product is highly related to the sintering temperature of the solid-state process. When the sintering temperature is below 700° C., all the raw materials have to be mixed well. If the raw materials are not mixed well, Fe$^{3+}$ impurity phase will be present in the LiFePO$_4$ powders. When sintering temperature is below 600° C., the average grain size of the LiFePO$_4$ powders will be smaller than 30 μm. However, if the sintering temperature is increased, the average grain size of the LiFePO$_4$ powders will be larger than 30 μm. When the average grain size of the LiFePO$_4$ powders is larger than 30 μm, a grinding process and a sieving process have to be performed to obtain powders with grain size between 1 μm to 10 μm. Hence, it is difficult to prepare LiFePO$_4$ powders with nano-size by the use of the solid-state process.

Therefore, it is desirable to provide a method for manufacturing nano-sized cathode materials of Li-ion batteries in a simple way, in order to increase the charge/discharge efficiency of the batteries and reduce the cost thereof.

SUMMARY

An object of the present disclosure is to provide an LiFePO$_4$ precursor for manufacturing an electrode material of an Li-ion battery and a method for manufacturing the same.

The LiFePO$_4$ precursor for manufacturing an electrode material of an Li-ion battery of the present disclosure can be represented by the following formula (I):

$$LiFe_{(1-a)}M_aPO_4 \quad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, $0 \leq a < 0.5$, the $LiFePO_4$ precursor does not have an olivine structure, and the $LiFePO_4$ precursor is powders constituted by plural flakes.

The method for manufacturing the aforesaid $LiFePO_4$ precursor of the present disclosure may comprise the following steps: providing a mixed organic solution, which comprises Li, Fe, and P, wherein the Li contained in the mixed organic solution is derived from a Li-containing precursor or a P and Li-containing precursor, the Fe contained in the mixed organic solution is derived from an Fe-containing precursor or a P and Fe-containing precursor, and the P contained in the mixed organic solution is derived from a P-containing precursor, a P and Li-containing precursor, or a P and Fe-containing precursor; and heating the mixed organic solution under reflux to a predetermined temperature and maintaining the predetermined temperature for a predetermined period to obtain the aforesaid $LiFePO_4$ precursor.

The present disclosure further provides a method for manufacturing an $LiFePO_4$ electrode material of an Li-ion battery, which comprises: providing the aforesaid $LiFePO_4$ precursor; and heat-treating the $LiFePO_4$ precursor to obtain the $LiFePO_4$ electrode material.

In the present disclosure, the precursors contained in the organic mixed solution are reacted with each other to form the $LiFePO_4$ precursor, which is a precursor for forming the $LiFePO_4$ electrode material of the Li-ion battery. Herein, the crystalline structure of the $LiFePO_4$ precursor of the present disclosure is different from that of the conventional $LiFePO_4$ powders used in the Li-ion battery. More specifically, the $LiFePO_4$ precursor of the present disclosure does not have an olivine structure.

In addition, when the $LiFePO_4$ precursor of the present disclosure is heat-treated, the $LiFePO_4$ electrode material of the Li-ion battery can be obtained. Herein, the shapes of the $LiFePO_4$ precursor can be maintained after the heat treatment, which means that the obtained $LiFePO_4$ electrode material have the same shapes as the $LiFePO_4$ precursor. In the present disclosure, the $LiFePO_4$ precursor is powders having flakes, so the obtained $LiFePO_4$ electrode material is also powders having flakes with thin thickness. Because the thickness of the obtained $LiFePO_4$ electrode material is very thin, the insertion and extraction path of the Li ions can be greatly shortened, and the diffusion rate of the Li ions can further be increased. When the obtained $LiFePO_4$ electrode material is used as cathode materials of the Li-ion battery, the charge-discharge efficiency of the Li-ion battery can be increased due to the short Li-ion diffusion path.

In the present disclosure, the $LiFePO_4$ precursor may comprise powders with different crystalline. In the present disclosure, the $LiFePO_4$ precursor may comprise an amorphous zone and a crystallized zone.

Herein, a content of the amorphous zone can be greater than a content of the crystallized zone. For example, a ratio of the content of the amorphous zone to the content of the crystallized zone can be ranged from 10:1 to 2:1, from 9:1 to 2:1, from 8:1 to 2:1, from 7:1 to 2:1, from 6:1 to 2:1, from 5:1 to 2:1, from 10:1 to 3:1, from 9:1 to 3:1, from 8:1 to 3:1, from 7:1 to 3:1, from 6:1 to 3:1, or from 5:1 to 3:1. In one embodiment of the present disclosure, the ratio is about 4:1, but the present disclosure is not limited thereto. In addition, the distribution of the amorphous zone and the crystallized zone in the $LiFePO_4$ precursor is not particularly limited. For example, several crystallized zones can be distributed among the amorphous zone.

In the present disclosure, the crystallized zone may comprise at least one selected from the group consisting of $C_2H_4Li_4O_7P_2 \cdot H_2O$, $Fe_3H_9(PO_4)_6 \cdot 6H_2O$, $Fe_2Fe(P_2O_7)_2$, $FeLiO_2$, $Li_2Fe_2O_4$, $FePO_4$, $C_6H_6FeO_8 \cdot 2H_2O$, $FePO_4(H_2O)_2$, $Li_2O_2$, Li, and $Fe_2O(PO_4)$. In another embodiment of the present disclosure, the crystallized zone may further comprise at least one selected from the group consisting of $Fe_3O_4$, $Fe_3PO_7$, $Fe_3Fe_4(PO_4)_6$ and $C_2HLiO_4 \cdot H_2O$.

In the present disclosure, the $LiFePO_4$ precursor may show an X-ray diffraction pattern having characteristic peaks at near 2θ angles of 19.37°, 21.47°, 24.11°, 25.95°, 32.35°, 35°, 36.46°, and 43.83°. In another embodiment of the present disclosure, the $LiFePO_4$ precursor may show the X-ray diffraction pattern having further characteristic peaks at near 2θ angles of 18.3°, 28.91° and 30.05°. It should be noted that, the XRD pattern of the $LiFePO_4$ precursor of the present disclosure is different from that of the $LiFePO_4$ powders with the olivine structure.

In the present disclosure, the $LiFePO_4$ precursor powders having the flakes and the $LiFePO_4$ powders obtained by heat-treating the $LiFePO_4$ precursor powders may respectively have a diameter ranged from 800 nm to 5 μm. In addition, the $LiFePO_4$ precursor powders having the flakes and the $LiFePO_4$ powders obtained by heat-treating the $LiFePO_4$ precursor powders may respectively have plural flakes. Herein, a length of each of the flakes is not particularly limited. For example, the length of each of the flakes can be respectively ranged from 400 nm to 5000 nm, from 400 nm to 3000 nm, from 400 nm to 2000 nm, from 400 nm to 1500 nm, from 400 nm to 1300 nm, from 400 nm to 1100 nm, 600 nm to 5000 nm, from 600 nm to 3000 nm, from 600 nm to 2000 nm, from 600 nm to 1500 nm, from 600 nm to 1300 nm, from 600 nm to 1100 nm, 700 nm to 5000 nm, from 700 nm to 3000 nm, from 700 nm to 2000 nm, from 700 nm to 1500 nm, from 700 nm to 1300 nm, or from 700 nm to 1100 nm. In addition, a thickness of each of the flakes is also not particularly limited. For example, the thickness of each of the flakes can be respectively ranged from 1 nm to 50 nm, from 1 nm to 40 nm, from 1 nm to 30 nm, from 1 nm to 20 nm, from 1 nm to 15 nm, from 3 nm to 50 nm, from 3 nm to 40 nm, from 3 nm to 30 nm, from 3 nm to 20 nm, from 3 nm to 15 nm, from 4 nm to 50 nm, from 4 nm to 40 nm, from 4 nm to 30 nm, from 4 nm to 20 nm, from 4 nm to 15 nm, from 5 nm to 50 nm, from 5 nm to 40 nm, from 5 nm to 30 nm, from 5 nm to 20 nm, from 5 nm to 15 nm, or from 5 nm to 14 nm.

In the present disclosure, when the $LiFePO_4$ precursor powders and the $LiFePO_4$ powders obtained by heat-treating the $LiFePO_4$ precursor powders respectively have plural flakes, the flakes can be gathered to from a flower-like shape or laminated to form a shale-like shape. In addition, one end of one of the flakes may be connected to one end of another one of the flakes.

In the present disclosure, the method for manufacturing the $LiFePO_4$ precursor may further comprise a step of coating the $LiFePO_4$ precursor with a carbon source through a milling process to form a carbon layer on the powders. Thus, the $LiFePO_4$ precursor powders of the present disclosure may be further coated with a carbon layer. In addition, a catalyst may also be added in the step of coating the $LiFePO_4$ precursor with the carbon source through the milling process. The catalyst can be, for example, ferrocene; but the present disclosure is not limited thereto. Herein, the milling process can be a ball-milling process, but the present disclosure is not limited thereto. Herein, the examples of the carbon source are not particularly limited, and can be any sugar such as sucrose, stearic acid, citric acid, lauric acid, polystyrene, polystyrene ball (PS ball) or vitamin C (L-ascorbate). In addition, the addition amount of the carbon source can be 0.1-40 wt % of the weight of the $LiFePO_4$ precursor powders. In one embodiment of the present disclosure, the addition amount of the carbon source can be 2.5-30 wt % of the weight of the $LiFePO_4$ precursor powders. In another embodiment of the present disclosure, the addition amount of the carbon source can be 5-20 wt % of the weight of the $LiFePO_4$ precursor powders.

In the method of the present disclosure, a small amount of metal-containing compounds may be further added in the mixed organic solution, and the doped metal in the $LiFePO_4$ precursor can increase the conductivity of the $LiFePO_4$ powders obtained by heat-treating the $LiFePO_4$ precursor powders. Herein, the doped metal can be at least one selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb. In addition, the metal-containing compounds may be sulfates, carbonates, nitrates, oxalates, acetates, chlorites, bromides, or iodides of the aforementioned doped metals. In one embodiment of the present disclosure, the metal-containing compounds are sulfates of the aforementioned doped metals. In another embodiment of the present disclosure, the metal-containing compounds are sulfates of Mn, Cr, Co, Cu, Ni, Zn, Al, or Mg. Thus, in the present disclosure, M in the formula (I) can be selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb. In one embodiment of the present disclosure, M in the formula (I) can be one or more metals selected from the group consisting of Mn, Cr, Co, Cu, Ni, Zn, Al, and Mg. In another embodiment of the present disclosure, M in the formula (I) can be one or more metals selected from the group consisting of Mn, Cu, Zn, Al, Ni, and Mg.

In the method of the present disclosure, the Li-containing precursor can be at least one selected from the group consisting of LiOH, $Li_2CO_3$, $LiNO_3$, $CH_3COOLi$, $Li_2C_2O_4$, $Li_2SO_4$, LiCl, LiBr, and LiI; the Fe-containing precursor can be at least one selected from the group consisting of $FeCl_2$, $FeBr_2$, $FeI_2$, $FeSO_4$, $(NH_4)_2Fe(SO_4)_2$, $Fe(NO_3)_2$, $FeC_2O_4$, $(CH_3COO)_2Fe$, and $FeCO_3$; the P-containing precursor can be at least one selected from the group consisting of $H_3PO_4$, $NaH_2PO_4$, $Na_2HPO_4$, $Mg_3(PO_4)_2$, and $NH_4H_2PO_4$; the P and Li-containing precursor can be at least one selected from the group consisting of $LiH_2PO_4$, $Li_2HPO_4$, and $Li_3PO_4$; and the P and Fe-containing precursor can be at least one selected from the group consisting of $Fe_3(PO_4)_2$, and $FePO_4$. In addition, the mixed organic solution may not only contain the aforementioned precursors, but also may contain other additives such as surfactants, dispersants, polymer electrolytes, and stabilizers, which can facilitate the synthesis reaction or the dissolution of the precursors. Herein, the examples of the surfactants can be cetyltrimethylammonium bromide (CTAB), sodium dodecylbenzene sulfonate (SDBS), sodium dodecyl sulfate (SDS), or octyl phenol ethoxylate (Triton-X100); the examples of the dispersants can be potassium dodecyl sulfate, ammonium dodecyl sulfate, calcium dodecyl sulfate, sodium dodecyl sulfate, copper dodecyl sulfate, sodium dodecyl sulfate, sodium tetradecyl sulfate, sodium hexadecyl Sulfate, sodium dodecyl benzene sulfonate, magnesium dodecyl benzene sulfonate, sodium dodecyl sulfonate, magnesium dodecyl sulfonate, sodium decyl sulfonate, or sodium decyl sulfate; the examples of the polymer electrolytes can be polyvinylpyrollidone (PVP), peroxyacetic acid (PAA), polyethyleneimine (PEI), or polyacrylamide (PAM); and the examples of the stabilizers can be polyvinyl alcohol (PVA), or polyvinyl acetate (PVAc). The aforementioned additives can control the crystal size and the preferential growth direction of the powders. In addition, the aforementioned additives can be used alone or two or more additives can be used together.

In the method of the present disclosure, the organic solvent in the mixed organic solution is not particularly limited, and can be any polyol organic solvents. For example, the organic solvent can be at least one selected from the group consisting of ethylene glycol (EG), diethylene glycol (DEG), glycerol, triethylene glycol (TEG), tetraethylene glycol (TTEG), polyethylene glycol (PEG), Dimethyl sulfoxide (DMSO), and N,N-dimethylmethanamide (DMF). In one embodiment of the present disclosure, the organic solvent is DEG, glycerol, or a combination thereof.

In the method of the present disclosure, the mixed organic solution is heated under reflux to a predetermined temperature and the predetermined temperature is maintained for a predetermined period to perform the reaction for obtaining the aforesaid $LiFePO_4$ precursor. Herein, the predetermined temperature can be ranged from 105° C. to 350° C., from 105° C. to 300° C., from 105° C. to 280° C., from 105° C. to 250° C., from 200° C. to 350° C., from 200° C. to 300° C., from 200° C. to 280° C., from 200° C. to 250° C., from 220° C. to 350° C., from 220° C. to 300° C., from 220° C. to 280° C. or from 220° C. to 250° C. In one embodiment of the present disclosure, the predetermined temperature is about 220° C. In addition, the predetermined temperature is maintained for a predetermined period to perform the reaction for forming the aforesaid $LiFePO_4$ precursor. Herein, the predetermined period can be ranged from 2 hrs to 20 hrs, from 2 hrs to 15 hrs, from 2 hrs to 10 hrs, from 2 hrs to 8 hrs, from 2 hrs to 5 hrs, from 2 hrs to 3 hrs, from 3 hrs to 20 hrs, from 3 hrs to 15 hrs, from 3 hrs to 10 hrs, from 3 hrs to 8 hrs, or from 3 hrs to 5 hrs. The temperature may be slightly increased when undergoing the reaction for forming the aforesaid $LiFePO_4$ precursor.

Herein, the mixed organic solution can be heated under an atmosphere or with an introduced gas flow. The atmosphere or the introduced gas flow can be used as a protective gas or a reducing gas, which may comprise one selected from the group consisting of $N_2$, $H_2$, He, Ne, Ar, Kr, Xe, CO, methane, $N_2$—$H_2$ mixture, and a mixture thereof. In one embodiment of the present disclosure, the protective gas or the reducing gas is $N_2$, $H_2$, or $N_2$—$H_2$ mixture. In another embodiment of the present disclosure, the protective gas or the reducing gas is $N_2$—$H_2$ mixture.

In the present embodiment, the pressure for heating the mixed organic solution or for performing the reaction for forming the aforesaid $LiFePO_4$ precursor can be about atmospheric pressure. However, the conventional process for forming $LiFePO_4$ powders is usually held under high pressure, and the apparatus for performing the conventional process is more expensive or complicated than the method of the present disclosure.

In the method of the present disclosure, the $LiFePO_4$ precursor may be heat-treated under an atmosphere or with an introduced gas flow to obtain the $LiFePO_4$ electrode material. Herein, the atmosphere or the introduced gas flow can also be used as a protective gas or a reducing gas, which may comprise one selected from the group consisting of $N_2$, $H_2$, He, Ne, Ar, Kr, Xe, CO, methane, $N_2$—$H_2$ mixture, and a mixture thereof. In one embodiment of the present disclosure, the protective gas or the reducing gas is Ar, $N_2$, $H_2$, or $N_2$—$H_2$ mixture. In another embodiment of the present disclosure, the protective gas or the reducing gas is Ar, or $N_2$—$H_2$ mixture.

In the method of the present disclosure, the temperature for the heat treatment can be ranged from 300° C. to 1000° C., from 400° C. to 1000° C., from 500° C. to 1000° C., from 300° C. to 900° C., from 400° C. to 900° C., or from 500° C. to 900° C. In one embodiment of the present disclosure, the temperature for the heat treatment is ranged from 500° C. to 860° C. In addition, the time period for performing the heat treatment can be ranged from 2 hrs to 20 hrs, from 2 hrs to 15 hrs, from 2 hrs to 10 hrs, from 2 hrs to 8 hrs, from 2 hrs to 5 hrs, or from 2 hrs to 3 hrs.

In addition, the obtained $LiFePO_4$ powders of the present disclosure can be used as a cathode material to prepare a Li-ion battery, through any conventional method in the art. Here, the method for manufacturing the Li-ion battery is briefly described, but the present disclosure is not limited thereto.

An anode current collector is coated with a carbon material, and then the carbon material is dried and pressed to form an anode for the Li-ion battery. A cathode current collector is coated with a cathode active material (i.e. the $LiFePO_4$ powders of the present disclosure), and then the cathode active material is dried and pressed to form a cathode for the Li-ion battery. Next, a separator is inserted between the cathode and the anode, a Li-containing electrolyte is injected, and a Li-ion battery is obtained after packaging.

Other objects, advantages, and novel features of the disclosure will become more apparent from the following detailed description when taken in conjunction with the accompanying drawings.

DETAILED DESCRIPTION OF THE EMBODIMENT

The following embodiments when read with the accompanying drawings are made to clearly exhibit the above-mentioned and other technical contents, features and/or effects of the present disclosure.

Through the exposition by means of the specific embodiments, people would further understand the technical means and effects that the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, when a value is in a range from a first value to a second value, the value can be the first value, the second value, or another value between the first value and the second value.

Example 1 to Example 29

The $LiFePO_4$ precursors of Example (Ex as the abbreviation in the following Table 1) 1 to Example 29 are synthesized according to the following Table 1. In the following Table 1, the addition amounts and molar ratios of $H_3PO_4$, $FeC_2O_4 \cdot 2H_2O$, and $LiOH \cdot H_2O$, ambient temperature (Temp 1), relative humidity (RH), time for increasing to 220° C. (T1), reaction time (T2), final temperature after the reaction is stopped (Temp 2), and $N_2$ gas flow ($N_2$).

In Example 1 to Example 25, $H_3PO_4$ (2 g), $FeC_2O_4 \cdot 2H_2O$ (3.6 g), and $LiOH \cdot H_2O$ (0.84 g) were mixed in a ratio of 1:1:1, and dissolved in DEG (100 ml) to obtain a mixed organic solution (0.2 M). In Example 20 and Example 26, SDBS (0.02 mole) and SDS (0.01 mole) was also added respectively into the mixed organic solution. In Example 27, $FeC_2O_4 \cdot 2H_2O$ used in Example 1 was replaced by $FeC_2O_4 \cdot H_2O$:$MnC_2O_4 \cdot 2H_2O$ (9:1). In Example 28, $FeC_2O_4 \cdot 2H_2O$ used in Example 1 was replaced by $FeC_2O_4 \cdot H_2O$:$NiC_2O_4 \cdot 2H_2O$ (9:1). In Example 29, $FeC_2O_4 \cdot 2H_2O$ used in Example 1 was replaced by $FeC_2O_4 \cdot H_2O$:$MnC_2O_4 \cdot 2H_2O$:$NiC_2O_4 \cdot 2H_2O$ (9:0.5:0.5). Next, the mixed organic solution was heated to 220° C. Then, $N_2$ gas was introduced, the mixed organic solution was reacted under reflux, at 220° C. for a period of time (T2). The reaction was performed under atmospheric pressure. After the mixed organic solution was filtrated, the $LiFePO_4$ precursor was obtained.

The obtained $LiFePO_4$ precursor was examined by an X-ray diffractometer (Shimadzu 6000) to obtain the crystal structure thereof. The X-ray diffraction pattern (XRD pattern) was obtained by applying Cu Kα radiation, the 2θ-scanning angle is ranged from 15° to 45°, and the scanning rate is 1°/min. The XRD pattern of the $LiFePO_4$ precursor of Example 1 is shown in FIG. 1.

Figure 1:
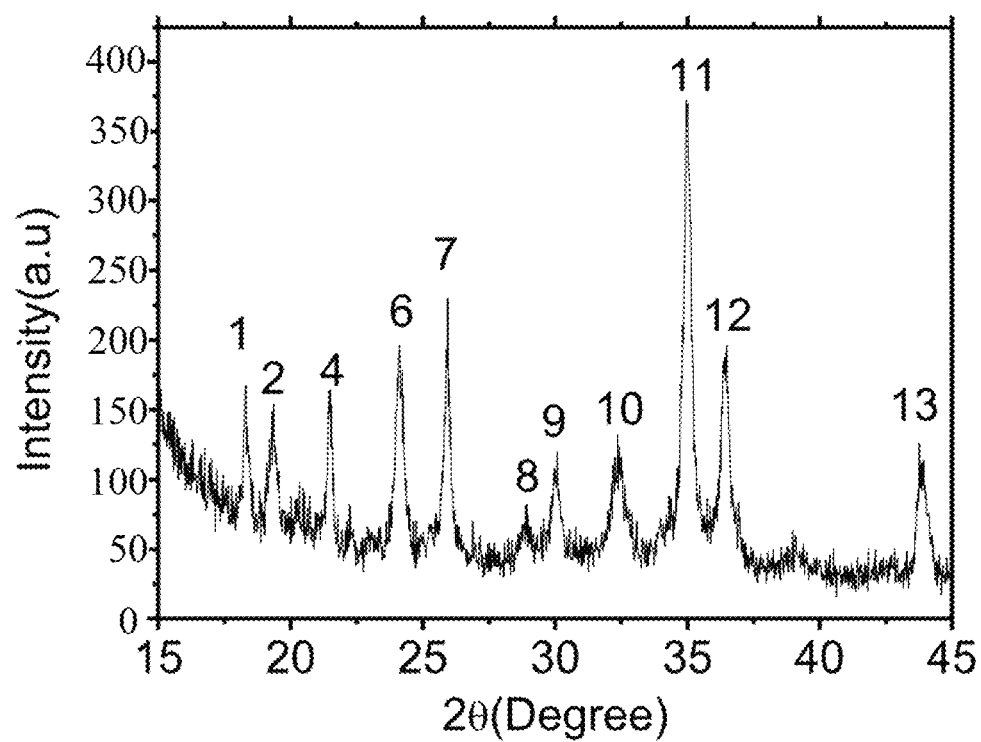
FIG. 1 is an XRD pattern of an $LiFePO_4$ precursor according to Example 1 of the present disclosure.

The XRD pattern shown in FIG. 1 has characteristic peaks at near 2θ angles of 19.37° (peak 2), 21.47° (peak 4), 24.110 (peak 6), 25.95° (peak 7), 32.35° (peak 10), 35° (peak 11), 36.46° (peak 12), and 43.83° (peak 13). In addition, the XRD pattern shown in FIG. 1 further has characteristic peaks at near 2θ angles of 18.3° (peak 1), 28.91° (peak 8) and 30.05° (peak 9).

The XRD pattern is different from the XRD pattern of $LiFePO_4$ crystal with an olivine structure (JCPDS No. 81-1173). Thus, the $LiFePO_4$ precursor of the present disclosure does not have an olivine structure.

The $LiFePO_4$ precursors prepared in Examples 2 to Example 29 are also examined by an X-ray diffractometer, and the obtained XRD patterns are similar to that shown in FIG. 1, except that some peaks (especially, the peak 1 and the peak 8) are very week or not found in the XRD patterns of the $LiFePO_4$ precursors of some examples. The presences of the peak 1 and peak 8 are also listed in the following Table 1.

TABLE 1

| Ex | Temp 1 (° C.) | RH (%) | T1 | T2 | Temp 2 (° C.) | $N_2$ (c.c./min) | Peak 1 | Peak 8 |
|---|---|---|---|---|---|---|---|---|
| 1 | 29 | 60 | 5 hr 29 min | 3 hr 1 min | 238 | 100+ | V | V |
| 2 | — | — | 8 hr 47 min | 3 hr 24 min | 237 | 100 | V | V |
| 3 | 27 | 68 | 5 hr 44 min | 3 hr | 239 | 100+ | V | V |
| 4 | 25 | 70 | 7 hr 12 min | 3 hr 13 min | 238 | 100+ | V | Δ |
| 5 | 25 | 60 | 2 hr 57 min | 3 hr 1 min | 242 | 100+ | V | V |
| 6 | 24 | 50 | 4 hr 43 min | 3 hr 13 min | 239 | 100+ | V | V |
| 7 | 29 | 55 | 5 hr 30 min | 3 hr 12 min | 239 | 100+ | V | Δ |
| 8 | — | — | 4 hr 22 min | 3 hr | 236 | 100+ | V | V |
| 9 | — | — | 5 hr 15 min | 3 hr | 238 | 100+ | Δ | Δ |
| 10 | — | — | 6 hr 29 min | 3 hr 2 min | 236 | 100+ | V | Δ |
| 11 | — | — | 5 hr 44 min | 3 hr 11 min | 240 | 100+ | V | V |
| 12 | 23 | 60 | — | — | — | 100+ | V | Δ |
| 13 | 23 | 60 | 8 hr 9 min | 3 hr 22 min | 240 | 100 | V | V |
| 14 | 23 | 60 | 8 hr 11 min | 3 hr 6 min | 235 | 100 | V | Δ |
| 15 | — | — | — | — | 241 | 100+ | Δ | Δ |
| 16 | 25 | 70 | 4 hr 16 min | 3 hr 4 min | 234 | 100 | X | V |
| 17 | 27 | 55 | 7 hr 37 min | 3 hr | 235 | 100 | X | Δ |
| 18 | 25 | 65 | 8 hr 43 min | 3 hr | 234 | 100 | X | X |
| 19 | 26 | 55 | 7 hr 2 min | 3 hr | 234 | 100 | X | X |
| 20 | 23 | 60 | 15 hr 30 min | 4 hr 19 min | 240 | 100 | X | Δ |
| 21 | 25 | 60 | 9 hr 46 min | 5 hr 59 min | 237 | 100 | X | X |
| 22 | 27 | 70 | 10 hr 13 min | 3 hr | 235 | 100+ | X | X |
| 23 | — | — | 5 hr 25 min | 5 hr 34 min | 242 | 100+ | X | X |
| 24 | — | — | 4 hr 15 min | 16 hr 23 min | 243 | 100+ | X | X |
| 25 | 29 | 65 | 8 hr 1 min | 16 hr | 241 | 100 | X | Δ |
| 26 | — | — | — | 3 hr | — | 100 | V | Δ |
| 27 | — | — | — | 3 hr | — | 100 | X | X |
| 28 | — | — | — | 3 hr | — | 100 | V | V |
| 29 | — | — | — | 3 hr | — | 100 | V+ | X |

V: Peak can be found.
V+: Peak is very strong.
Δ: Peak is very weak or almost disappears.
X: Peak cannot be found.
—: Not measured.

According to the data shown in Table 1, the presences of the peak 1 and peak 8 may not be related to the ambient temperature, relative humidity, time for increasing to 220° C., reaction time, final temperature, and $N_2$ gas flow. The intensity of the peaks (especially, the peak 1 and the peak 8) may be related to the compounds or the contents of the compounds existing in the $LiFePO_4$ precursors.

According to the XRD data (JCPDS card), it is found that the XRD pattern of the compound containing Li, Fe, P, O or H may have one peak with the strongest intensity. Herein, each peaks contributed by which crystallized compound are investigated by comparing the XRD pattern of FIG. 1 with JCPDS cards. The comparison results are listed in the following Table 2.

TABLE 2

| Peak 2θ | Compound 1 JCPDS No. | Compound 1 Formula | Compound 2 JCPDS No. | Compound 2 Formula |
|---|---|---|---|---|
| Peak 1 18.3° | 74-1910 | $Fe_3O_4$ Magnetite | — | — |
| Peak 2 19.37° | 46-1551 | $C_2H_4Li_4O_7P_2 \cdot H_2O$ Lithium hydroxyl ethyldiene phosphonate | 44-812 | $Fe_3H_9(PO_4)_6 \cdot 6H_2O$ Iron hydrogen phosphate hydrate |
| Peak 4 21.47° | 80-2315 | $Fe_2Fe(P_2O_7)_2$ Iron phosphate | — | — |
| Peak 6 24.11° | 65-2754 | $FeLiO_2$ Tetragonal Lithium iron(III) oxide | 75-1603 | $Li_2Fe_2O_4$ Lithium iron(III) oxide |
| Peak 7 25.95° | 72-2124 | $FePO_4$ Iron(III) phosphate | 33-1721 | $C_6H_6FeO_8 \cdot 2H_2O$ Iron hydrogen malonate dihydrate |
| Peak 8 28.91° | 76-1761 | $Fe_3PO_7$ Triiron(III) trioxide phosphate(V) | | |
| Peak 9 30.05° | 72-2446 | $Fe_3Fe_4(PO_4)_6$ Iron phosphate | 49-1209 | $C_2HLiO_4 \cdot H_2O$ Lithium hydrogen oxalate hydrate |
| Peak 10 32.35° | 72-464 | $FePO_4(H_2O)_2$ Phosphosiderite | | |
| Peak 11 35° | 74-115 | $Li_2O_2$ Lithium peroxide | | |
| Peak 12 36.46° | 89-4083 | Li Lithium | | |
| Peak 13 43.83° | 48-582 | $Fe_2O(PO_4)$ Alpha-iron oxide phosphate | | |

In addition, the $LiFePO_4$ precursors obtained in Examples 1 to 29 were also examined by Inductively Coupled Plasma (ICP). The results show that the atomic ratio of Li, Fe and P was very close to 1:1:1 (i.e. Li:Fe:P=1:1:1) in the $FePO_4$ precursors obtained in Examples 1 to 29, which indicated that the $LiFePO_4$ precursors obtained in Examples 1 to 29 can be directly used to prepare the $LiFePO_4$ electrode material.

Example 30 to Example 35

In Example 30 to Example 35, the LiFePO$_4$ precursors prepared in Examples 4, 6, 3, 13, 9, and 14 were respectively coated with a carbon source through a milling process to form a carbon layer on the powders of the LiFePO$_4$ precursors. Briefly, a carbon source was dissolved in a milling solution, followed by mixing with the LiFePO$_4$ precursor. Then, zirconia balls were used and the milling process was held for 2 hrs to obtain the LiFePO$_4$ precursor with a carbon layer formed thereon. In Example 34, the milling solution with the carbon source (steric acid) was heated to well dissolve the steric acid.

The diameter of the used zirconia balls, the milling solution used in the milling process, the carbon source, and the weight ratio of the carbon source to the LiFePO$_4$ precursor are listed in the following Table 3. In addition, the obtained LiFePO$_4$ precursor coated with the carbon source was also examined by an X-ray diffractometer (Shimadzu 6000) to obtain the crystal structure thereof. The XRD patterns of the LiFePO$_4$ precursor with or without the carbon layer formed thereon were compared, and the comparison results are listed in the following Table 3.

TABLE 3

| Ex | LiFePO$_4$ precursor | Diameter | Milling solution | Carbon source & weight ratio | Changes in the XRD patterns |
|---|---|---|---|---|---|
| 30 | Example 4 | 0.8 mm | 25 ml H$_2$O | Sucrose 0.15 | Peak 1 disappeared Peak 8 disappeared Peak 9 weakened |
| 31 | Example 6 | 0.8 mm | 5 ml H$_2$O + 20 ml EtOH | Sucrose 0.15 | Peak 1 weakened Peak 8 disappeared Peak 9 weakened |
| 32 | Example 3 | 2 mm | 25 ml H$_2$O | Sucrose 0.15 | Peak 1 weakened Peak 8 disappeared Peak 9 weakened |
| 33 | Example 13 | 2 mm | 5 ml H$_2$O + 20 ml EtOH | Sucrose 0.15 | Peak 1 weakened Peak 8 disappeared Peak 9 weakened |
| 34 | Example 9 | 2 mm | 30 ml EtOH | Steric acid 0.083 | Peak 1 weakened Peak 8 disappeared Peak 9 weakened |
| 35 | Example 14 | 2 mm | 25 ml Toluene | Polystyrene 0.068 | Peak 1 weakened Peak 8 disappeared Peak 9 weakened |

The results of Example 30 to Example 35 indicate that the crystalline of the LiFePO$_4$ precursor is decreased or the lattice of the crystals in the LiFePO$_4$ precursor is destroyed due to the milling process. In addition, in Example 32 to Example 35, after the milling process, the decreasing level of the intensity of the peak 9 in Example 32 is greater than that in Example 33, the decreasing level of the intensity of the peak 9 in Example 33 is greater than that in Example 34, and the decreasing level of the intensity of the peak 9 in Example 35 is very small. These results indicate that the decreasing level of the intensity of the peak 9 is related to the water content in the milling solution.

Figure 2A:
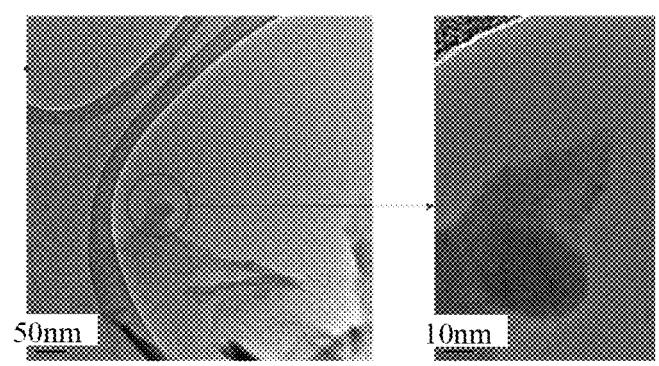
FIG. 2A to FIG. 2C shows TEM photos of one region of an $LiFePO_4$ precursor according to Example 1 of the present disclosure.
Figure 2B:
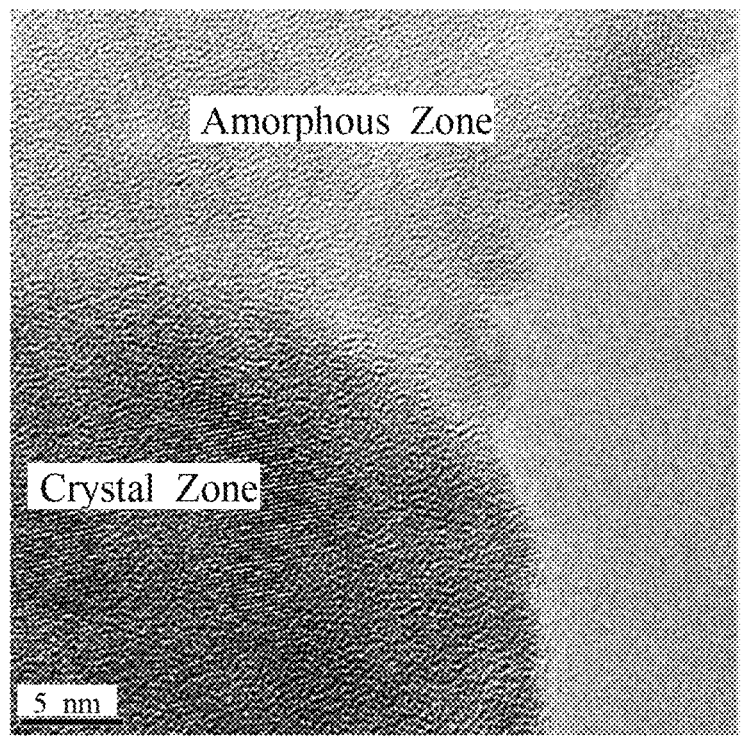
Figure 2C:
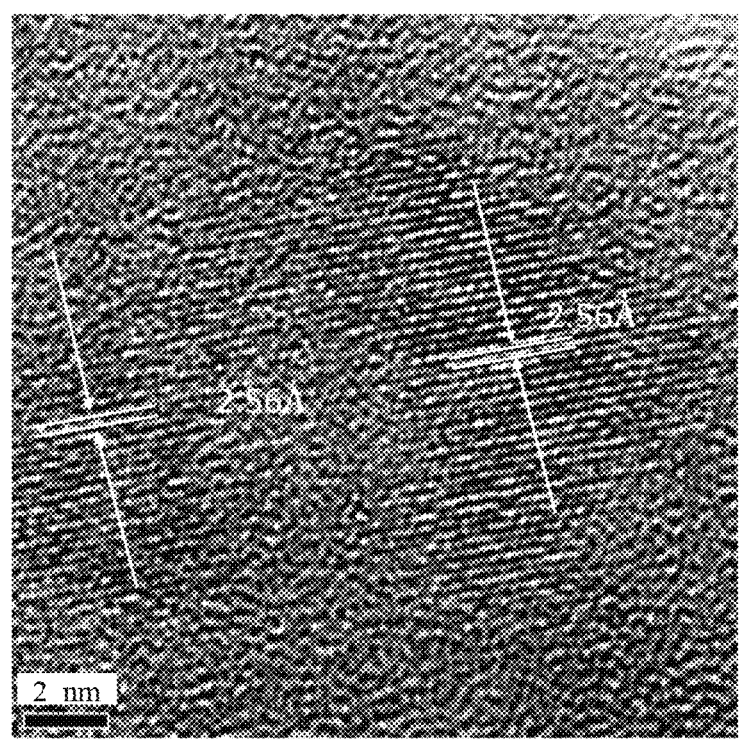

The shapes of the LiFePO$_4$ precursor prepared in Example 1 were also observed with a high resolution transmission electron microscope (TEM) (JEOL 2010). FIG. 2A to FIG. 2C show TEM photos of one region of an LiFePO$_4$ precursor according to Example 1 of the present disclosure.

It is found that 80% of the LiFePO$_4$ precursor is amorphous zones and 20% of the LiFePO$_4$ precursor is crystallized zones, and the crystallized zones are spread among the amorphous zones.

Figure 3:
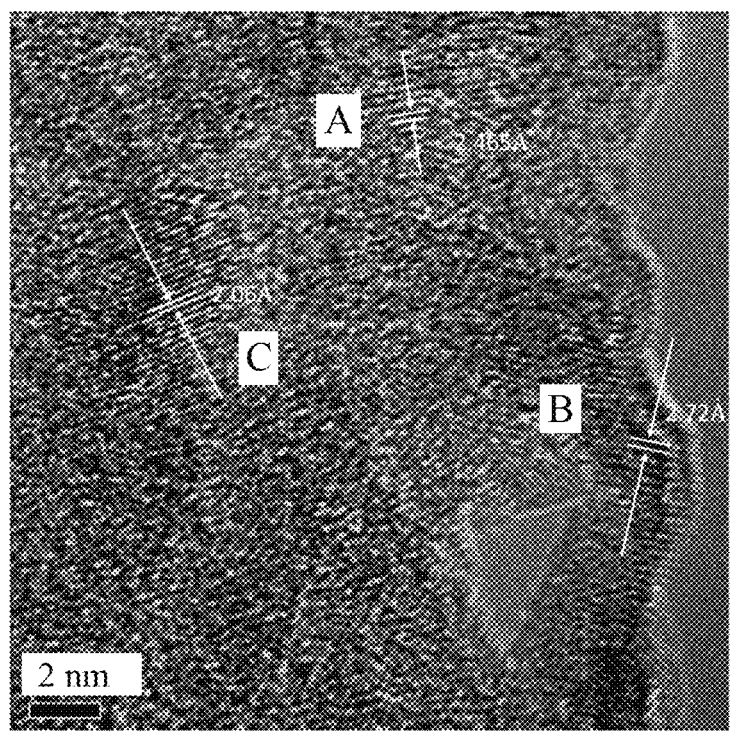
FIG. 3 is a TEM photo of another region of an $LiFePO_4$ precursor according to Example 1 of the present disclosure.

The left photo shown in FIG. 2A was observed at the magnification of 40,000×. The right photo shown in FIG. 2A is the circle region of the left photo, which is one flake of the LiFePO$_4$ precursor and was observed at the magnification of 200,000×. The photo shown in FIG. 2B was observed at the magnification of 600,000×, which shows that one flake of the LiFePO$_4$ precursor is formed by an amorphous zone and a crystallized zone. After measured by Gatan Microscopy Suite Software, the result shown in FIG. 2C shows that the d-spacing of the crystallized zone is 2.56 Å, which is consistent with the interplanar spacing of (1, 0, 1) planes of Li$_2$O$_2$(JCPDS No. 75-115). As shown in FIG. 1 and Table 2, the strongest peak of the LiFePO$_4$ precursor is the peak 11, which is contributed by crystallized Li$_2$O$_2$. The crystallized zone shown in FIG. 2B and FIG. 2C has good crystalline and this crystallized zone is identified as the crystallized Li$_2$O$_2$; thus, the strongest peak 11 should be contributed by the crystallized Li$_2$O$_2$ FIG. 3 is a TEM photo of another region an LiFePO$_4$ precursor according to Example 1 of the present disclosure, which was observed at the magnification of 500,000×. It is found that different fringes can be found in one flake of the LiFePO$_4$ precursor. As shown in FIG. 3, three zones indicated by A, B and C with different fringe directions can be found, and some zones without good crystalline may exist between the zones indicated by A, B and C. After measured by Gatan Microscopy Suite Software, in the zone A, the d-spacing of the crystallized zone is 2.465 Å, which is consistent with the interplanar spacing of (1, 1, 0) planes of Li (JCPDS No. 89-4083). In the zone B, the d-spacing of the crystallized zone is 2.72 Å, which is similar to the interplanar spacing of (1, 2, 2) planes of FePO$_4$(H$_2$O)$_2$ (JCPDS No. 72-464). In the zone C, the d-spacing of the crystallized zone is 2.06 Å, which is consistent with the interplanar spacing of (0, 3, 1) planes of Fe$_2$O(PO$_4$) (JCPDS No. 48-582). The crystallized zones A, B and C shown in FIG. 3 have good crystalline and these crystallized zones A, B and C are respectively identified as Li, the crystallized FePO$_4$(H$_2$O)$_2$ and the crystallized Fe$_2$O(PO$_4$); thus, the peaks 12, 10 and 13 should be respectively contributed by Li, the crystallized FePO$_4$(H$_2$O)$_2$ and the crystallized Fe$_2$O(PO$_4$).

Figure 4:
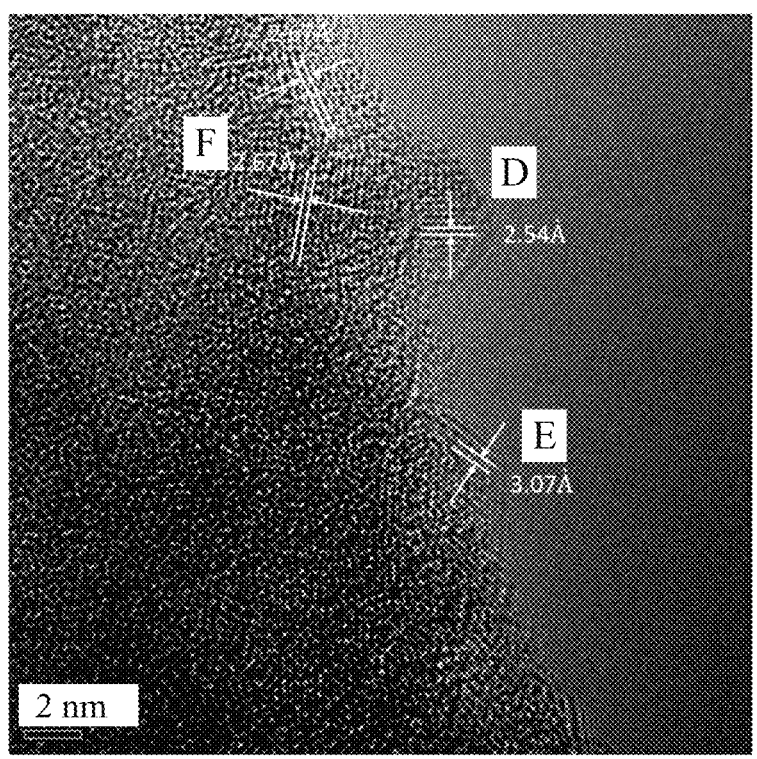
FIG. 4 is a TEM photo of further another region of an $LiFePO_4$ precursor according to Example 1 of the present disclosure.

FIG. 4 is a TEM photo of further another region of an LiFePO$_4$ precursor according to Example 1 of the present disclosure, which was observed at the magnification of 600,000×. It is found that different fringes can be found in one flake of the LiFePO$_4$ precursor. As shown in FIG. 4, three zones indicated by D, E and F with different fringe directions can be found, and some zones without good crystalline may exist between the zones indicated by D, E and F. After measured by Gatan Microscopy Suite Software, in the zone D, the d-spacing of the crystallized zone is 2.54 Å, which is consistent with the interplanar spacing of (1, 3, 2) planes of C$_6$H$_6$FeO$_8$·2H$_2$O (JCPDS No. 33-1721). In the zone E, the d-spacing of the crystallized zone is 3.07 Å, which is similar to the interplanar spacing of (0, 1, 2) planes of Fe$_3$PO$_7$ (JCPDS No. 76-1761). In the zone F, the d-spacing of the crystallized zone is 2.67 Å, which is consistent with the interplanar spacing of (2, $\bar{1}$, 1) planes of Fe$_3$Fe$_4$(PO$_4$)$_6$(JCPDS No. 72-2446). The crystallized zones D, E and F shown in FIG. 4 have good crystalline and these crystallized zones D, E and F are respectively identified as the crystallized C$_6$H$_6$FeO$_8$·2H$_2$O, the crystallized Fe$_3$PO$_7$ and the crystallized Fe$_3$Fe$_4$(PO$_4$)$_6$; thus, the peaks 7, 8 and 9 should be respectively contributed by the crystallized C$_6$H$_6$FeOs$_8$.2H$_2$O, the crystallized Fe$_3$PO$_7$ and the crystallized Fe$_3$Fe$_4$(PO$_4$)$_6$.

According to the results shown in FIG. 2A to FIG. 4, the $LiFePO_4$ precursor are powders comprising amorphous zones and crystallized zones contributed from different crystallized compounds. Thus, the powders of the $LiFePO_4$ precursor are constituted by different crystallized compounds. In particular, one flake of the powder of the $LiFePO_4$ precursor may be constituted by more than one crystallized compounds.

The shapes of the $LiFePO_4$ precursor prepared in Example 1 were also observed with a scanning electron microscope (SEM) (Hitachi S-4000). The results are shown in FIG. 5A to FIG. 5F.

Figure 5A:
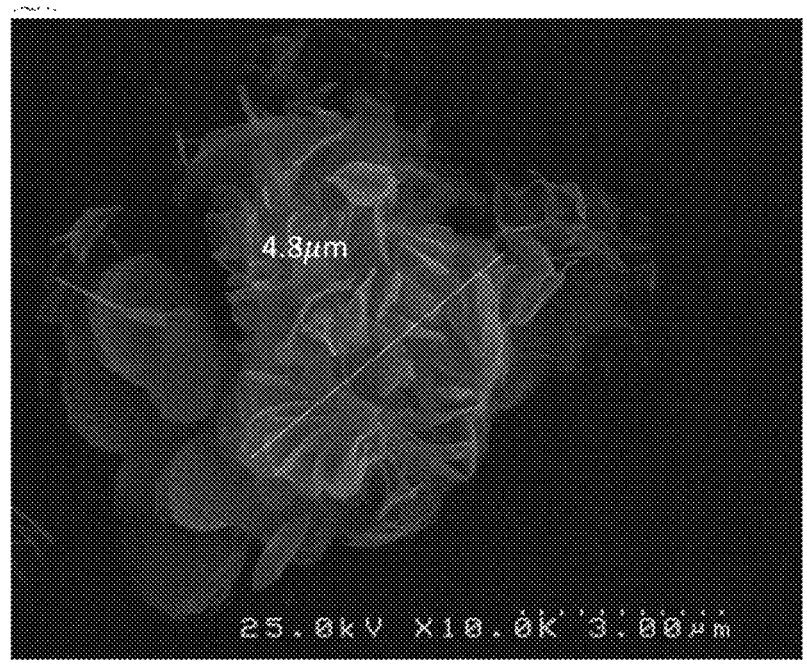
FIG. 5A to FIG. 5F are SEM photos of an $LiFePO_4$ precursor according to Example 1 of the present disclosure.
Figure 5B:
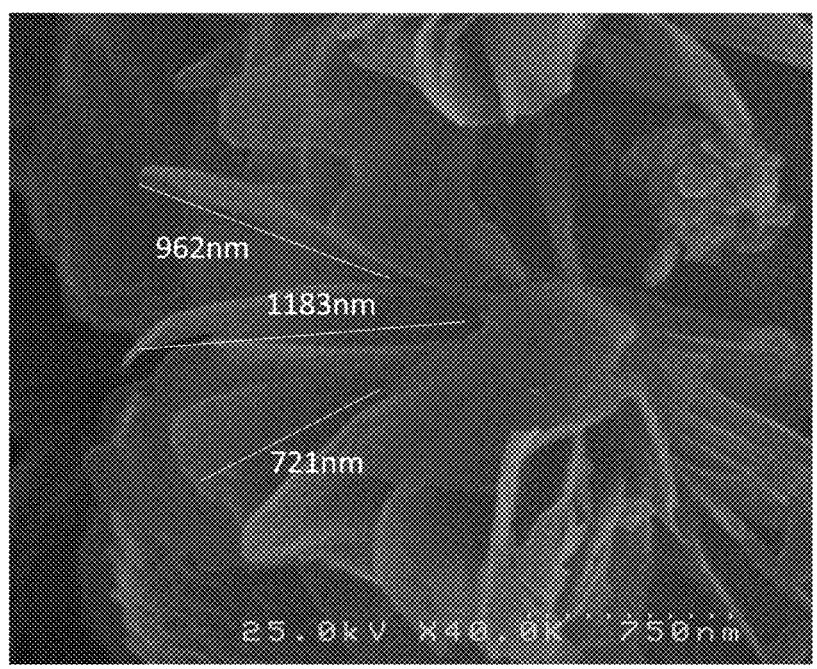
Figure 5C:
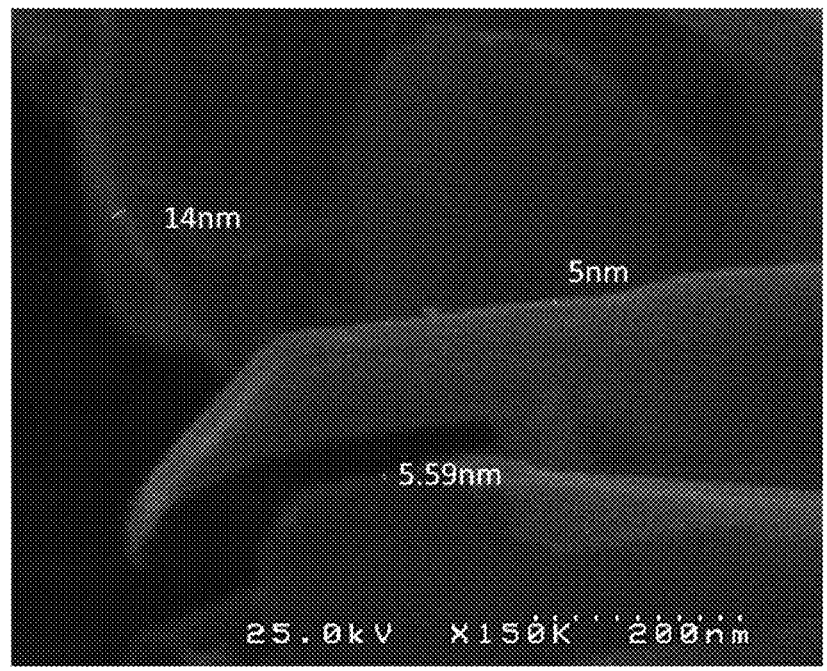

FIG. 5A was observed at the magnification of 10,000×. It can be found that the $LiFePO_4$ precursor is a powder having flakes, and a diameter of the powder is about 5 μm. It can also be found that the powder have plural flakes, which are gathered to form a flower-like shape. FIG. 5B was observed at the magnification of 40,000×. It can be found that each flake has a length of about 700 nm to 1000 nm. FIG. 5C was observed at the magnification of 150,000×. It can be found that each flake has a width of about 5 nm to 14 nm.

Figure 5D:
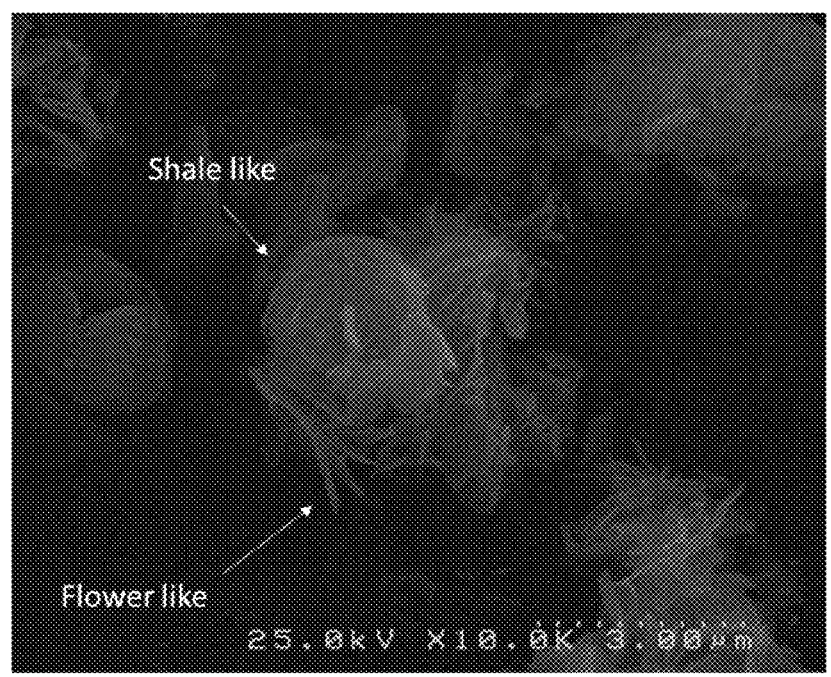
Figure 5E:

In addition to the shapes shown in FIG. 5A to FIG. 5C, the powder of the $LiFePO_4$ precursor may have other shape, in which the flakes are laminated to form a shale-like shape. FIG. 5D was observed at the magnification of 10,000×, which shows that some flakes are gathered to form a flower-like shape and some flakes are laminated to form a shale-like shape. FIG. 5E was observed at the magnification of 80,000×. It can be found that the gaps are present between flakes to form the shale-like shape.

Figure 5F:
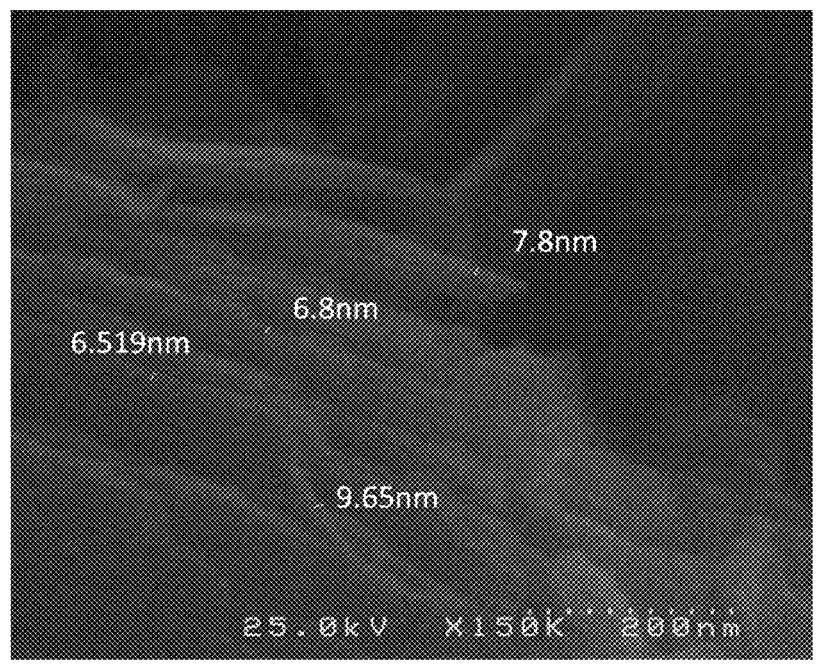

FIG. 5F was observed at the magnification of 150,000×. It can be found that each flake has a thickness of about 5 nm to 10 nm. Thus, the flakes of the powders of the $LiFePO_4$ precursor have similar thicknesses despite the shapes of the powders.

According to the results shown in FIG. 5A to FIG. 5G, the $LiFePO_4$ precursor is a powder constituted with flakes. When the $LiFePO_4$ precursor of the present disclosure is heat-treated to form $LiFePO_4$, the obtained $LiFePO_4$ powder can also be a powder constituted with flakes. Thus, Li ions can extract from the powders in a uniform and high-density manner, so the current density of the Li-ion batteries can be further increased.

Example 36 to Example 43

$H_3PO_4$, $FeC_2O_4$, and LiOH were mixed in a ratio of 1:1:1, and dissolved in DEG to obtain a mixed organic solution. Next, the mixed organic solution was heated to 220° C. Then, $N_2$ gas was introduced, the mixed organic solution was reacted under reflux, at 220° C. for 3 hrs. After the mixed organic solution was filtrated, synthetic powders were obtained.

The synthetic powders were washed with DI water for three times, followed by dried at 55° C. to obtain the $LiFePO_4$ precursors.

The obtained $LiFePO_4$ precursors were respectively mixed with sucrose (15 wt %), and the mixtures were mixed by using a 3D mixer for 2 hrs to obtain mixing powders.

The mixing powders were placed in a vacuum heat treatment furnace introduced with $N_2$ gas or a heat treatment furnace introduced with $N_2$ constant airflow, and the heat treatment was held at 750° C. for 2 hrs. Then, $LiFePO_4$ powders for an electrode material were obtained.

The $LiFePO_4$ precursors prepared in Examples 36 to Example 43 were also examined by an X-ray diffractometer, and the obtained XRD patterns are similar to that shown in FIG. 1. Herein, only the peak 1 and the peak 8 are listed in the following Table 4.

In addition, the shapes of the $LiFePO_4$ precursors and $LiFePO_4$ powders prepared in Example 36 to Example 43 were also observed with a scanning electron microscope (SEM) (Hitachi S-4000). The results are summarized in the following Table 4.

TABLE 4

| Ex | DEG (ml) | Concentration of the mixed organic solution | XRD features of the $LiFePO_4$ precursors | Shapes of the $LiFePO_4$ precursors | Shapes of the $LiFePO_4$ powders |
|---|---|---|---|---|---|
| 36 | 100 | 0.22M | Peak 1: small Peak 8: small | Petals and plates Thickness: 18~24 nm Length of the petals: 700~1,800 nm Length of the plates: 1,500~2,000 nm | Petals and plates Thickness: 5~25 nm Length of the petals: 550~1,400 nm Length of the plates: 700~1,400 nm |
| 37 | 150 | 0.22M | Peak 1: medium Peak 8: small | Petals and plates Thickness: 15~20 nm Length of the petals: 800~1,800 nm Length of the plates: 800~2,400 nm | Petals and plates Thickness: 16~20 nm Length of the petals: 450~1,300 nm Length of the plates: 800~2,100 nm |
| 38 | 100 | 0.33M | Peak 1: medium Peak 8: small | Petals and plates Thickness: 20~25 nm Length of the petals: 800~2,000 nm Length of the plates: 800~1,900 nm | Petals and plates Thickness: 12~20 nm Length of the petals: 650~1,400 nm Length of the plates: 800~2,000 nm |

TABLE 4-continued

| Ex | DEG (ml) | Concentration of the mixed organic solution | XRD features of the LiFePO$_4$ precursors | Shapes of the LiFePO$_4$ precursors | Shapes of the LiFePO$_4$ powders |
|---|---|---|---|---|---|
| 39 | 150 | 0.33M | Peak 1: medium<br>Peak 8: small | Petals and plates<br>Thickness: 12~24 nm<br>Length of the petals: 600~1,700 nm<br>Length of the plates: 800~1,900 nm | Petals and plates<br>Thickness: 10~20 nm<br>Length of the petals: 500~1,300 nm<br>Length of the plates: 900~2,000 nm |
| 40 | 100 | 0.44M | Peak 1: medium<br>Peak 8: small | Petals and plates<br>Thickness: 15~20 nm<br>Length of the petals: 450~1,500 nm<br>Length of the plates: 450~2,000 nm | Petals and plates<br>Thickness: 12~24 nm<br>Length of the petals: 350~1,300 nm<br>Length of the plates: 500~1,800 nm |
| 41 | 150 | 0.44M | Peak 1: medium<br>Peak 8: small | Petals and plates<br>Thickness: 16~20 nm<br>Length of the petals: 550~1,550 nm<br>Length of the plates: 500~2,600 nm | Petals and plates<br>Thickness: 12~21 nm<br>Length of the petals: 600~1,500 nm<br>Length of the plates: 600~1,900 nm |
| 42 | 960 | 0.48M | Peak 1: very small<br>Peak 8: disappeared | Petals (with a 3D structure) and plates<br>Thickness: 14~23 nm<br>Length of the petals: 600~2,000 nm<br>Length of the plates: 800~2,400 nm<br>Gap between plates: >20 nm | Petals and plates<br>Thickness: 20 nm<br>Length of the petals: 400~1,750 nm<br>Length of the plates: 400~2,400 nm |
| 43 | 67 | 0.66M | Peak 1: large<br>Peak 8: small | Petals and plates<br>Thickness: 12~20 nm<br>Length of the petals: 500~1,500 nm<br>Length of the plates: 800~1,600 nm | Petals and plates<br>Thickness: 15~22 nm<br>Length of the petals: 550~1,500 nm<br>Length of the plates: 700~1,500 nm |

Although the present invention has been explained by its preferred embodiment, it is to be understood that many other possible modifications and variations can be made without departing from the spirit and scope of the present disclosure as hereinafter claimed.

What is claimed is:

1. An LiFePO$_4$ precursor for manufacturing an electrode material of an Li-ion battery, represented by the following formula (I):

$$LiFe_{(1-a)}M_aPO_4 \quad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, $0 \leq a < 0.5$, the LiFePO$_4$ precursor does not have an olivine structure, and the LiFePO$_4$ precursor is powders constituted by plural flakes;
wherein the LiFePO4 precursor comprises an amorphous zone and a crystallized zone.

2. The LiFePO$_4$ precursor of claim 1, wherein a content of the amorphous zone is greater than a content of the crystallized zone.

3. The LiFePO$_4$ precursor of claim 1, wherein the crystallized zone comprises at least two selected from the group consisting of C$_2$H$_4$Li$_4$O$_7$P$_2$·H$_2$O, Fe$_3$H$_9$(PO$_4$)$_6$·6H$_2$O, Fe$_2$Fe(P$_2$O$_7$)$_2$, FeLiO$_2$, Li$_2$Fe$_2$O$_4$, FePO$_4$, C$_6$H$_6$FeO$_8$·2H$_2$O, FePO$_4$(H$_2$O)$_2$, Li$_2$O$_2$, Li, and Fe$_2$O(PO$_4$).

4. The LiFePO$_4$ precursor of claim 3, wherein the crystallized zone further comprises at least one selected from the group consisting of Fe$_3$O$_4$, Fe$_3$PO$_7$, Fe$_3$Fe$_4$(PO$_4$)$_6$ and C$_2$HLiO$_4$·H$_2$O.

5. The LiFePO$_4$ precursor of claim 1, which shows an X-ray diffraction pattern having characteristic peaks at near 2θ angles of 19.37°, 21.47°, 24.11°, 25.95°, 32.35°, 35°, 36.46°, and 43.83°.

6. The LiFePO$_4$ precursor of claim 5, which shows the X-ray diffraction pattern having further characteristic peaks at near 2θ angles of 18.3°, 28.91° and 30.05°.

7. The LiFePO$_4$ precursor of claim 1, wherein the powders has a diameter ranged from 800 nm to 5 μm, a length of each of the plural flakes is respectively ranged from 400 nm to 5000 nm, and a thickness of each of the plural flakes is respectively ranged from 1 nm to 50 nm.

8. The LiFePO$_4$ precursor of claim 7, wherein the plural flakes are gathered to from a flower-like shape or laminated to form a shale-like shape.

9. The LiFePO$_4$ precursor of 1, wherein the powders are further coated with a carbon layer.

10. A method for manufacturing an LiFePO$_4$ precursor for manufacturing an electrode material of an Li-ion battery, comprising the following steps:
providing a mixed organic solution, which comprises Li, Fe, and P, wherein the Li contained in the mixed organic solution is derived from a Li-containing precursor or a P and Li-containing precursor, the Fe contained in the mixed organic solution is derived from an Fe-containing precursor or a P and Fe-containing precursor, and the P contained in the mixed organic solution is derived from a P-containing precursor, a P and Li-containing precursor, or a P and Fe-containing precursor; and
heating the mixed organic solution under reflux to a predetermined temperature and maintaining the predetermined temperature for a predetermined period to obtain an LiFePO$_4$ precursor, wherein the LiFePO$_4$ precursor is represented by the following formula (I):

$$LiFe_{(1-a)}M_aPO_4 \qquad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, 0≤a<0.5, the LiFePO$_4$ precursor does not have an olivine structure, and the LiFePO$_4$ precursor is powders constituted by plural flakes,
wherein the LiFePO$_4$ precursor comprises an amorphous zone and a crystallized zone.

11. The method of claim 10, further comprising a step of coating the LiFePO$_4$ precursor with a carbon source through a milling process to form a carbon layer on the powders.

12. The method of claim 11, wherein the mixed organic solution is heated under an atmosphere or with an introduced gas flow.

13. The method of claim 12, wherein the atmosphere or the introduced gas flow comprises one selected from the group consisting of N$_2$, He, Ne, Ar, Kr, Xe, CO, methane, N$_2$—H$_2$ mixed gas, and a mixture thereof.

14. The method of claim 10, wherein the Li-containing precursor is at least one selected from the group consisting of LiOH, Li$_2$CO$_3$, LiNO$_3$, CH$_3$COOLi, Li$_2$C$_2$O$_4$, Li$_2$SO$_4$, LiCl, LiBr, and LiI; the Fe-containing precursor is at least one selected from the group consisting of FeCl$_2$, FeBr$_2$, FeI$_2$, FeSO$_4$, (NH$_4$)$_2$Fe(SO$_4$)$_2$, Fe(NO$_3$)$_2$, FeC$_2$O$_4$, (CH$_3$COO)$_2$Fe, and FeCO$_3$; the P-containing precursor is at least one selected from the group consisting of H$_3$PO$_4$, NaH$_2$PO$_4$, Na$_2$HPO$_4$, Mg$_3$(PO$_4$)$_2$, and NH$_4$H$_2$PO$_4$; the P and Li-containing precursor is at least one selected from the group consisting of LiH$_2$PO$_4$, Li$_2$HPO$_4$, and Li$_3$PO$_4$; and the P and Fe-containing precursor is at least one selected from the group consisting of Fe$_3$(PO$_4$)$_2$, and FePO$_4$.

15. The method of claim 10, wherein the mixed organic solution is heated under atmospheric pressure.

16. The method of claim 10, wherein an organic solvent in the mixed organic solution is at least one selected from the group consisting of ethylene glycol (EG), diethylene glycol (DEG), glycerol, triethylene glycol (TEG), tetraethylene glycol (TTEG), polyethylene glycol (PEG), Dimethyl sulfoxide (DMSO), and N,N-dimethylmethanamide (DMF).

17. The method of claim 10, wherein the predetermined temperature is ranged from 105° C. to 350° C., and the predetermined period is ranged from 2 hrs to 20 hrs.

18. The method of claim 10, wherein the LiFePO$_4$ precursor shows an X-ray diffraction pattern having characteristic peaks at near 2θ angles of 19.370, 21.47°, 24.110, 25.95°, 32.350, 350, 36.46°, and 43.83°.

19. The method of claim 18, wherein the LiFePO$_4$ precursor shows the X-ray diffraction pattern having further characteristic peaks at near 2θ angles of 18.3°, 28.91° and 30.05°.

20. The method of claim 10, wherein the mixed organic solution further comprises a dispersant.

21. The method of claim 20, wherein the dispersant is at least one selected from the group consisting of potassium dodecyl sulfate, ammonium dodecyl sulfate, calcium dodecyl sulfate, sodium dodecyl sulfate, copper dodecyl sulfate, sodium dodecyl sulfate, sodium tetradecyl sulfate, sodium hexadecyl Sulfate, sodium dodecyl benzene sulfonate, magnesium dodecyl benzene sulfonate, sodium dodecyl sulfonate, magnesium dodecyl sulfonate, sodium decyl sulfonate, and sodium decyl sulfate.

* * * * *